(12) United States Patent
Dissett et al.

(10) Patent No.: US 7,311,632 B2
(45) Date of Patent: Dec. 25, 2007

(54) GEARLESS LOCKING DIFFERENTIAL

(75) Inventors: Walter L. Dissett, Farmington Hills, MI (US); Jeffrey P. Lane, Sterling Heights, MI (US)

(73) Assignee: Tractech Inc., Madison Heights, MI (US)

( * ) Notice: Subject to any disclaimer, the term of this patent is extended or adjusted under 35 U.S.C. 154(b) by 171 days.

(21) Appl. No.: 11/189,614

(22) Filed: Jul. 26, 2005

(65) Prior Publication Data

US 2007/0026992 A1 Feb. 1, 2007

(51) Int. Cl.
*F16H 48/06* (2006.01)
(52) U.S. Cl. ..................................... 475/231
(58) Field of Classification Search ........... 475/231, 475/236, 240, 249, 235, 238, 239, 332, 232, 475/234, 241; 74/650
See application file for complete search history.

(56) References Cited

U.S. PATENT DOCUMENTS

| | | | | |
|---|---|---|---|---|
| 3,233,477 A | * | 2/1966 | O'Brien | 475/234 |
| 4,498,355 A | * | 2/1985 | Schou | 74/650 |
| 4,735,108 A | * | 4/1988 | Teraoka et al. | 74/650 |
| 5,655,418 A | * | 8/1997 | Barnholt | 74/607 |
| 5,727,430 A | | 3/1998 | Valente | |
| 6,010,424 A | * | 1/2000 | Irwin | 475/231 |
| 6,063,000 A | * | 5/2000 | Sugimoto | 475/231 |
| 6,374,701 B1 | * | 4/2002 | Tittjung | 74/650 |
| 6,688,194 B2 | | 2/2004 | Dissett et al. | |
| 2002/0151402 A1 | * | 10/2002 | Zentmyer | 475/231 |

* cited by examiner

Primary Examiner—Charles A. Marmor
Assistant Examiner—Justin K. Holmes
(74) *Attorney, Agent, or Firm*—Lawrence E. Laubscher, Sr.; Lawrence E. Laubscher, Jr.

(57) ABSTRACT

A gearless locking differential includes clutch housings containing V-shaped slots that cooperate with a cross pin to disconnect from the differential drive shaft an overrunning driven shaft, characterized in that the wall surfaces that define the V-slots extend parallel with the axis of rotation of the differential housing, and the cross pin has tapered convergent end portions. The frictions packs that releasably connect the side gears to the clutch members include annular friction plates that are arranged between pairs of reaction plates and include polygonal internal surfaces that slidably and non-rotatably engage a corresponding polygonal circumferential surface on the associated side gear. The locking lug and locking slot that cooperate to provided limited angular relative displacement between the clutch housings each have parallel side walls. As a consequence of the invention, the machining and finishing of the components of the differential are achieved in a simplified cost-effective manner.

7 Claims, 10 Drawing Sheets

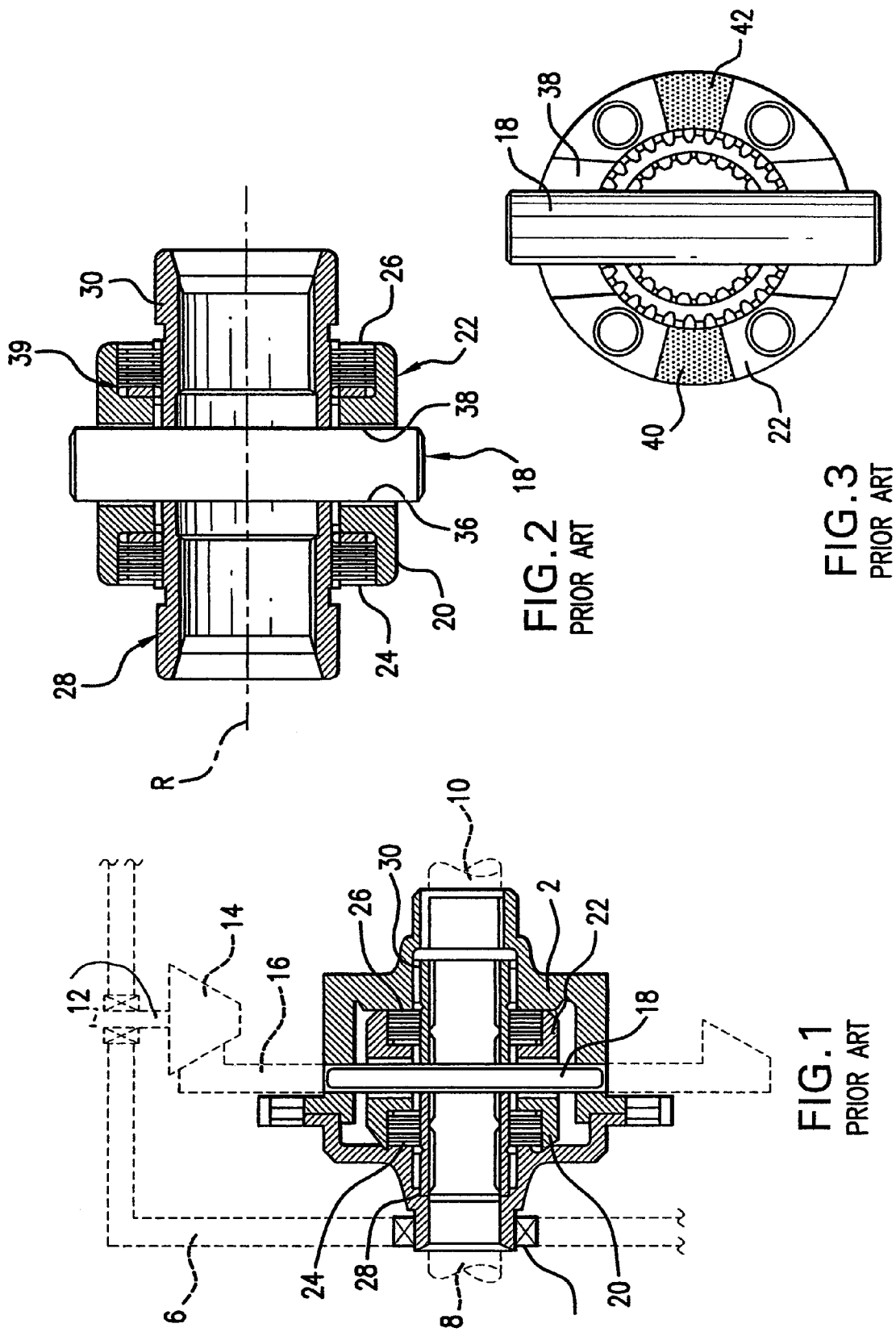

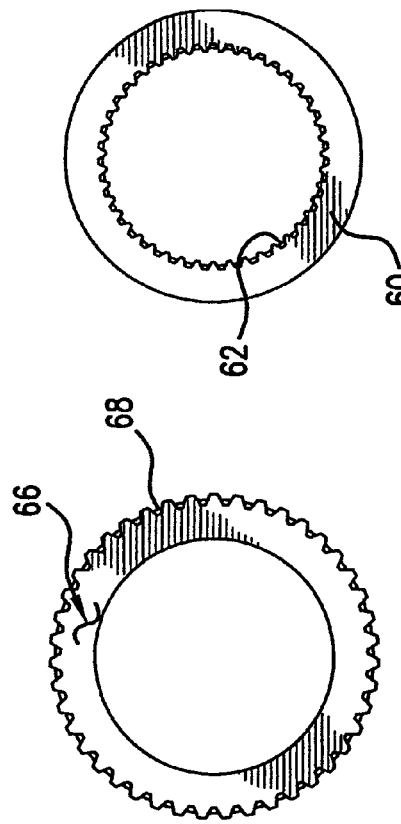
FIG. 13
PRIOR ART
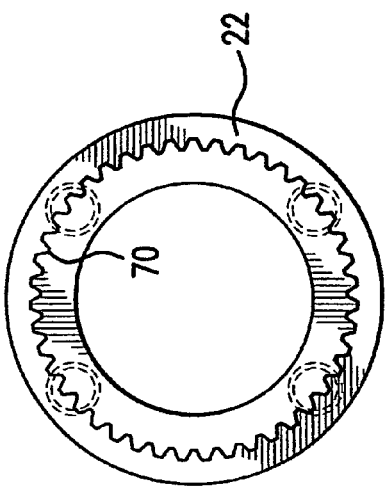
FIG. 14
PRIOR ART
FIG. 15
PRIOR ART
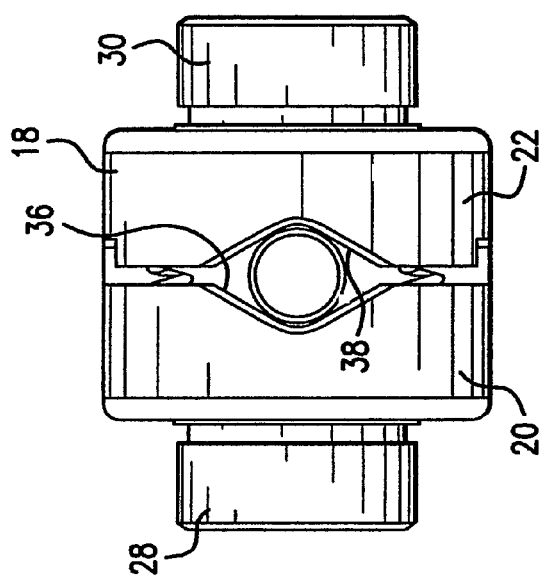
FIG. 10
PRIOR ART
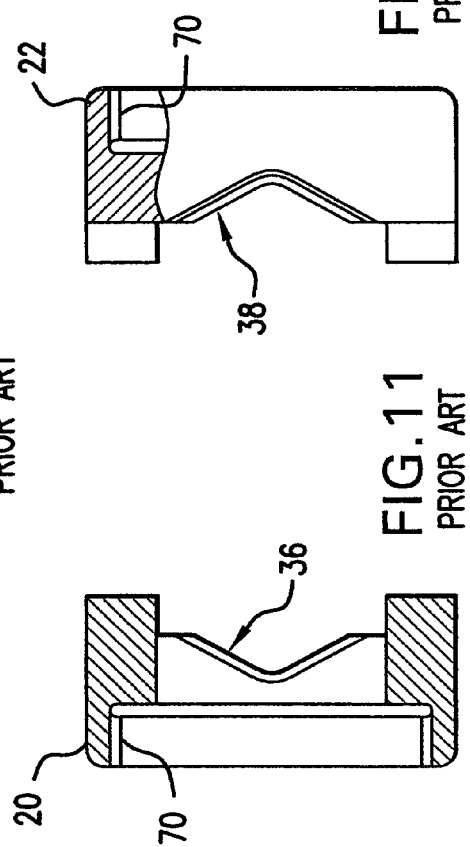
FIG. 12
PRIOR ART
FIG. 11
PRIOR ART

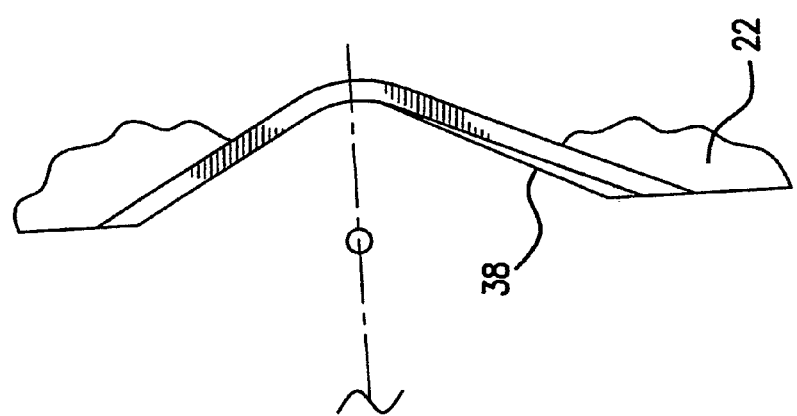
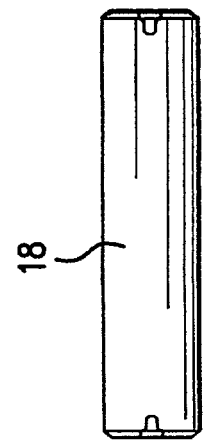
FIG. 19 PRIOR ART
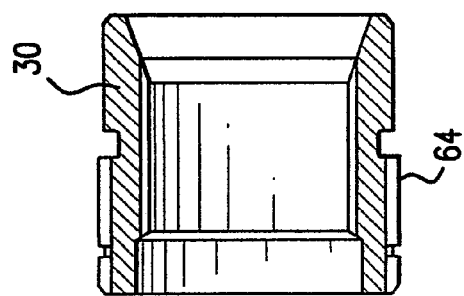
FIG. 18 PRIOR ART
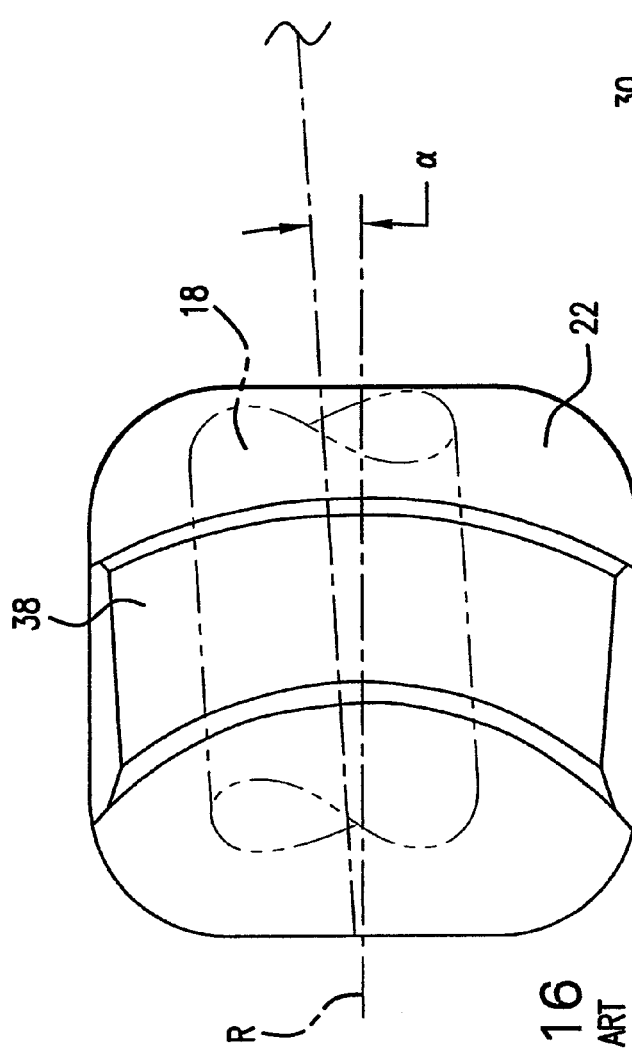
FIG. 16 PRIOR ART
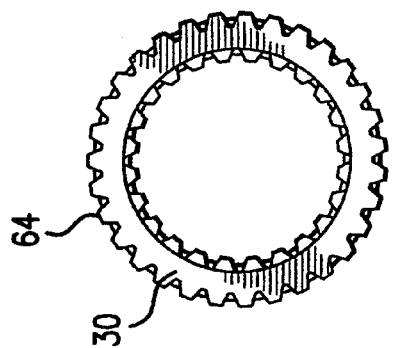
FIG. 17 PRIOR ART

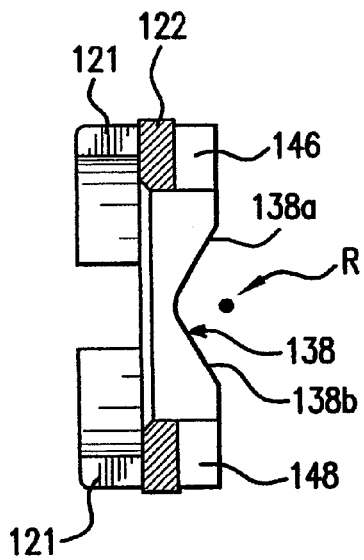
FIG.27
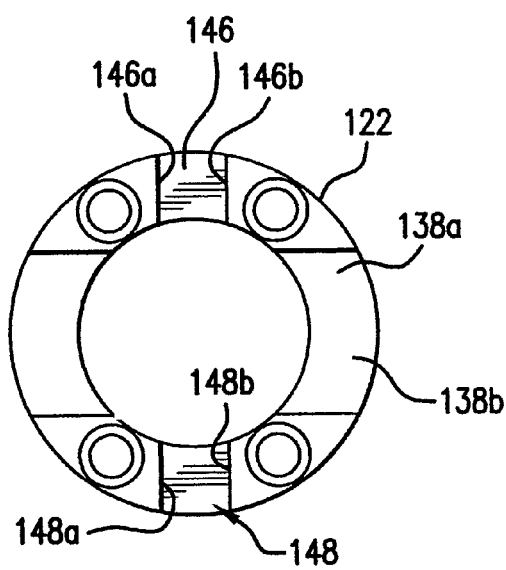
FIG.29
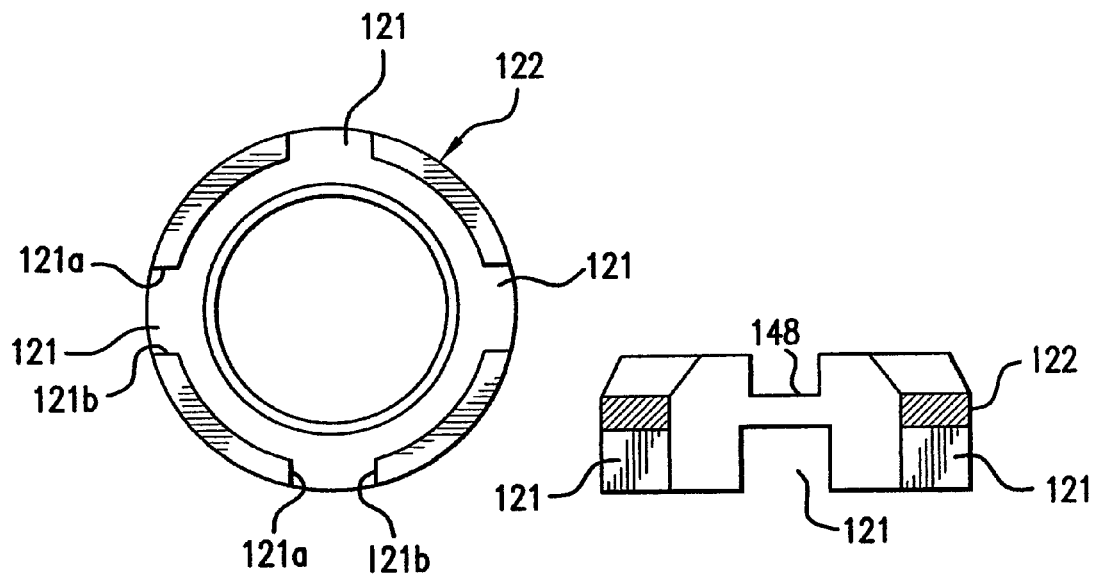
FIG.28
FIG.30

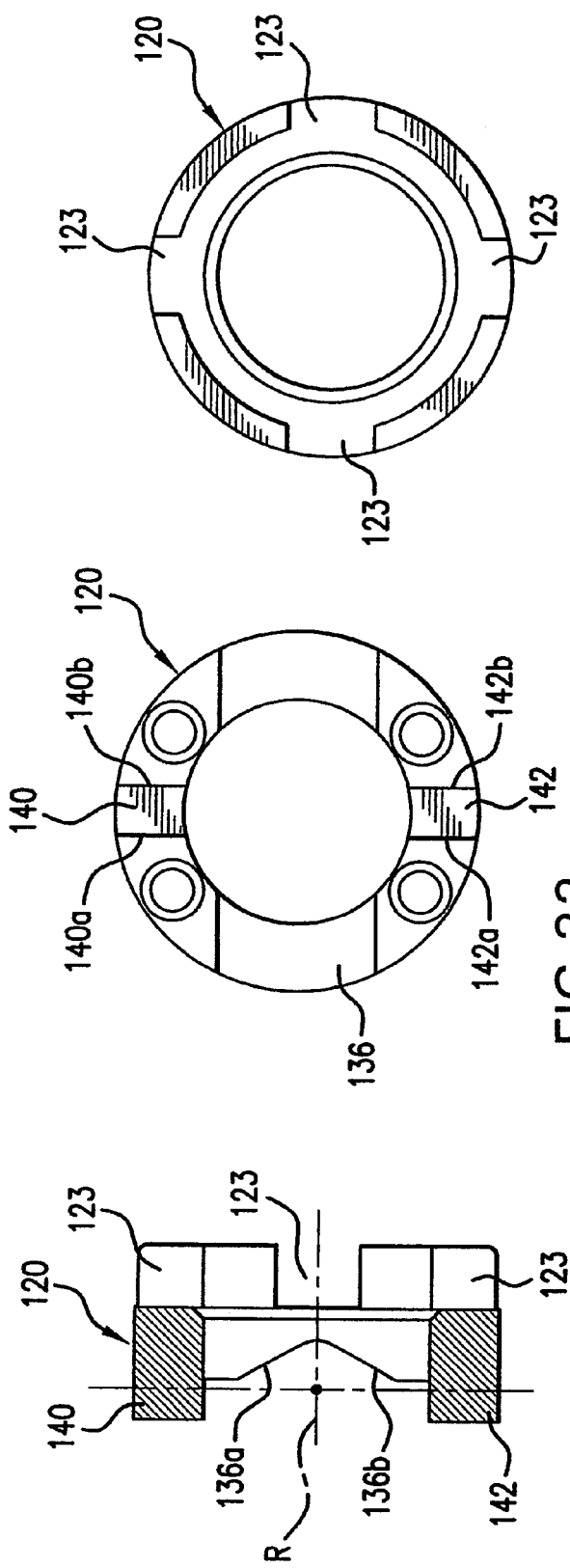

GEARLESS LOCKING DIFFERENTIAL

BACKGROUND OF THE INVENTION

1. Field of the Invention

A gearless locking differential includes clutch members having V-shaped slots that cooperate with a cross pin to disconnect from the differential drive shaft an overrunning driven shaft, characterized in that the wall surfaces that define the V-slots extend parallel with the axis of rotation of the differential housing, and the cross pin has tapered convergent end portions. The frictions packs that releasably connect the side gears to the clutch housings include annular friction plates that are arranged between pairs of reaction plates and include polygonal internal circumferential surfaces that slidably and non-rotatably engage a corresponding polygonal circumferential surface on the associated side gear. The locking lug and the locking slot which cooperate to provided limited angular relative displacement between the clutch housings each have parallel side walls. As a consequence of the invention, the machining and finishing of the differential components is achieved in a simplified cost-effective manner.

2. Description of the Related Art

Locking differentials for automotive vehicles are well known in the patented prior art, as evidenced by the patents to Lewis U.S. Pat. No. 2,555,044, Zentmyer U.S. Pat. No. 5,413,015, and Valente U.S. Pat. Nos. 5,590,572 and 5,727,430, and Dissett U.S. Pat. No. 5,715,733, and Dissett et al U.S. Pat. No. 6,6988,194.

In these known differentials, it is common to utilize a pair of annular coaxially-arranged axially-spaced clutch members arranged on opposite sides of a diametrically extending driving cross pin that extends within mating cam grooves contained in the adjacent faces of the clutch members. Spring means normally bias the clutch members apart, and a locking pin extends axially from one face into a recess contained in the adjacent face of the other clutch member, thereby to prevent relative rotational movement between the clutch members. The locking pins are generally separate components, used in connection with a plurality of biasing springs and spacer disks or plugs, thereby causing assembly of the differential to be relatively labor intensive and manually difficult.

In the original design shown in the Dissett et al U.S. Pat. No. 6,688,194, it was necessary o manufacture the "V" ramps on the clutch housing in a skewed manner in a very complicated three dimensional plane. This was required for the cylindrical shaped cross pin to make a full line contact on the "V" ramps of the clutch housing, at the point where all of the end-play from the clutch housing to the differential case was taken up, allowing a good distribution of the loading and full clutch pack lock-up. As the cross pin rotates relative to the clutch housing, it runs up the ramp on the clutch housing and moves the housing in an outward direction locking up the clutch pack. This movement allows the torque to be transferred from the clutch housing to the side gear and then to the axle shaft.

The present invention was developed to provide an improved locking differential that is less expensive and easier to produce and inspect, and which affords improved relative sliding movement between the components of the friction packs, whereby the possibility of binding of the components is greatly reduced. According to the present invention, the clutch housing and the side gears can be completely manufactured from powdered metal with no secondary machining required. These two major components can also be cold or warm forged for higher load applications with much less secondary machining that the prior art production design. The improved design of the friction and reaction plates as well as the inner spacer have been designed to simplify the manufacture thereof and to improve the smoothness of the energizing and de-energizing of the friction reaction plates by allowing them to slide easier on the side gear and in the clutch housing, respectively. For lower volume manufacturing needs, all the slots, keyways and keys have been designed with straight and parallel sides, thereby to allow for simple milling operations. It will also be easier to inspect these components.

BRIEF SUMMARY OF THE INVENTION

Accordingly, a primary object of the present invention is to provide an improved differential in which the cooperating flat surfaces of the V-shaped cam grooves on the clutch housings that receive the cross pin are planar and extend parallel with the axis of rotation of the differential housing. The cross pin has a right cylindrical body portion, and a pair of tapered end portions that each converge progressively inwardly in the direction of the end extremities.

In the new design, the "V" ramps on the clutch housing are made in a two dimensional plane that can be manufactured and inspected by simply milling a slot straight across the clutch housing face. The new cross pin has been designed with angular surfaces that provide full line contact with the "V" ramps of the clutch housing. With this new configuration, it is easy to inspect the cross pin rather than the three-dimensional V-ramp surfaces on the clutch housings. When the cross pin is radially rotated by the same amount as the cross pin in the original design, it takes up the same end-play as the original design, distributes the load and gives a full clutch pack lock-up.

Another object of the invention if to provide an improved friction pack arrangement including alternate friction and reaction plates, which friction plates are slidably and non-rotatably connected with the associated side gear by polygonal tangential planar surfaces arranged on the outer circumference of the side gears and on the inner circumferences of the friction disks, respectively. The reaction plates are slidably and non-rotatably connected with the associated clutch housings by means of radially-outwardly-extending circumferentially-spaced integral tab portions that extend within corresponding axial guide slots contained in the clutch housings, the side walls of the tabs and the guide slots being parallel with each other and with the axis of rotation of the differential casing.

According to a further object of the invention, the side walls of the locking lug and the oversized locking slot are parallel with each other and with the axis of rotation of the differential housing. The purpose of the key and slot is to restrict the angular movement between the two clutch housings so that the outside wheel, in a turn, cannot allow its clutch housing to run up the back side of the "V" and re-engage that clutch pack. In the prior art design, by putting the key and slot on an angle, a surface contact is produced between the two to spread out the load. With straight sided key and slot, a line contact is produced. However, the loading is so low that the manufacturing cost savings is more beneficial with the straight sided key and slot. The overall angular movement is the same for both designs.

BRIEF DESCRIPTION OF THE DRAWINGS

Other objects and advantages of the invention will become apparent from a study of the following specification when viewed in the light of the accompanying drawings, in which:

FIG. 1 is a longitudinal sectional view of a locking differential of the prior art;

FIG. 2 is a longitudinal sectional view of the prior art side gear, clutch and friction pack means of FIG. 1;

FIG. 3. is a transverse view of the apparatus of FIG. 2 with certain parts removed.

FIG. 10 is a top view of the side gear, clutch housing and friction pack arrangement of FIG. 2, and FIGS. 11 and 12 are sectioned and partly sectioned views, respectively, of the prior art clutch housings of FIG. 10;

FIGS. 13 and 14 are end views of the reaction plates and friction plates, respectively, of the friction pack means of FIG. 2, and FIG. 15 is an end view of one of the of the clutch housings of FIG. 10;

FIG. 16 is a detailed schematic view illustrating the cooperation between the cross pin and the V-shaped slot contained in the face of the clutch housing;

FIGS. 17 and 18 are end and longitudinal sectional views, respectively, of a clutch housing of the prior art differential of FIG. 2, and FIG. 19 is an elevation view of the cross pin of FIG. 2;

FIGS. 27-30 are side elevation, front, rear and bottom views, respectively, of the key-containing clutch housing of FIG. 24, and FIGS. 31-34 are side elevation, left hand end, right hand end and bottom views, respectively, of the clutch housing that carries the locking lug;

FIG. 35 is an elevation view of the improved cross pin of the present invention;

DETAILED DESCRIPTION OF THE INVENTION

Figure 4:
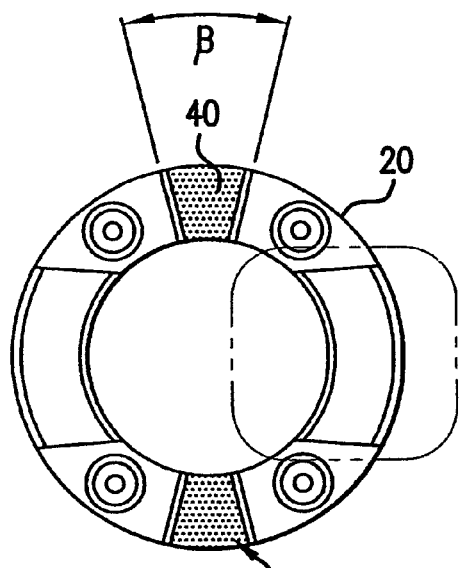
FIGS. 4-6 are front elevation, top and partly sectioned bottom views of the male locking end of the clutch housing of FIG. 1, and FIGS. 7-9 are corresponding views of the female end of the clutch housing of FIG. 1.
Figure 7:
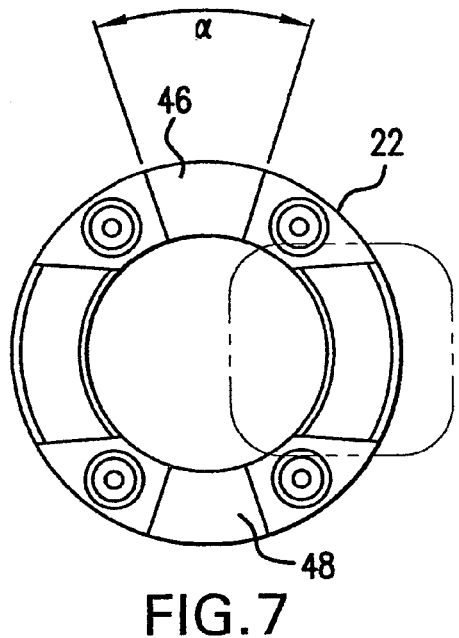
Figure 5:
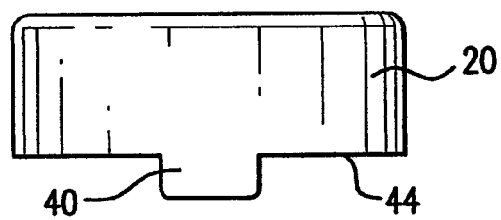
Figure 8:
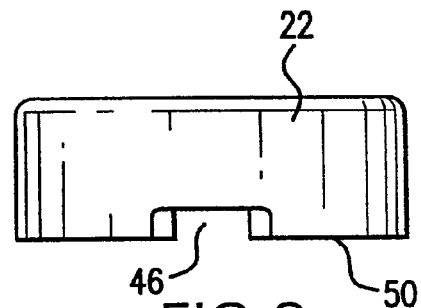
Figure 6:
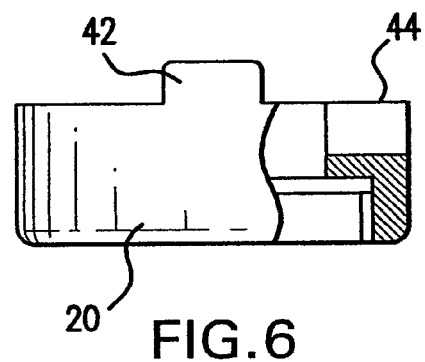
Figure 9:
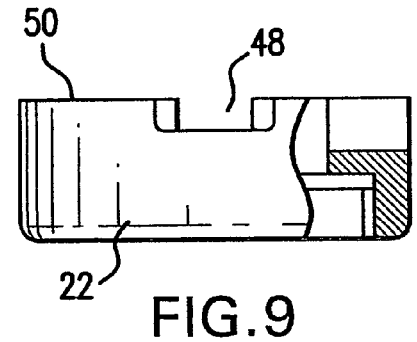

Referring first to the prior art embodiment of FIGS. 1-19, the structure and operation of the prior art locking differential is described in detail in the Dissett et al U.S. Pat. No. 6,688,194, the disclosure of which is incorporated herein. Briefly, the locking differential of FIG. 1 includes a differential housing 2 that is rotatably supported by bearing means 4 for rotation within the outer chamber of the differential casing 6. A pair of collinearly-arranged output shafts 6 and 8 are driven by the vehicle drive shaft 12 via pinion 14 and ring gear 16, housing 2, cross pin 18, annular clutch members 20 and 22, annular friction packs 24 and 26, and side gears 28 and 30. The ends of the cross pin 18 are supported in corresponding bores contained in the differential housing.

Referring to FIGS. 2, 3, 11 and 12, the cross pin 18 is received in V-shaped slots 36 and 38 contained in the adjacent faces of the clutch members 20 and 22, respectively. According to a characterizing feature of the prior art locking differential best shown in FIG. 16, in order to achieve the desired operation of the locking differential, the faces of the V-shaped slots are skewed by the acute angle a relative to the axis of rotation R of the differential The acute angle of skew ranges from about 2.5° to about 4.5°. In the illustrated embodiment, the angle of skew is 3.8539°. This angle of skew is important, because of the right cylinder configuration of cross pin 19, as shown in FIG. 19. It has proven to be rather difficult and costly to machine the skewed faces of the V-slots 36 and 38 with the desired degree of accuracy.

As best shown in FIGS. 4-9, in order to achieve a desired amount of angular play between the clutch housings 20 and 22, the clutch housing 20 is provided with a pair of locking lugs 40 and 42 that extend axially from the end face 44 of clutch housing 20 into corresponding oversized slots or keys 46 and 48 contained in the adjacent end face 50 of the clutch housing 22. In this prior art embodiment, the side walls of the projections 40 and 42 are angularly arranged to subtend an angle β of about 27.20°, and the side walls of the keys or slots 46 and 48 are angularly arranged to subtend an angle γ of about 35.00°, thereby to give an angular play of about 7.80°. The machining of the angularly arranged side walls of the projections 40 and 42 and the slots 46 and 48 has proven to be rather difficult and costly.

Finally, another problem that has been discovered in the prior art locking differential is the structure and operation of the friction pack means 24 and 26. In this embodiment, spaced friction plates 60 (FIG. 14) are connected for non-rotational axial sliding displacement relative to the side gears 28 and 30 by splines 62 on the inner circumference of the first friction plates, which splines cooperate with corresponding splines 64 (FIG. 17) on the outer circumferential surface of the sides gears 28 and 30. Similarly, the spaced reaction plates 66 that are alternately arranged with the friction plates are connected for non-rotational axial sliding displacement relative to the clutch housings 20 and 22 by splines 68 (FIG. 13) that cooperate with corresponding splines 70 (FIG. 15) provided on the walls of the counterbore portions of the clutch housings, as shown in FIGS. 11 and 12. Not only are the splined surfaces on the friction plates, side gears and clutch housings difficult and expensive to produce, but often they lead to binding which adversely affects the operation of the differential mechanism.

The present invention of FIGS. 20-39 was developed to avoid these and other drawbacks of the locking differentials of the prior art.

Figure 20:
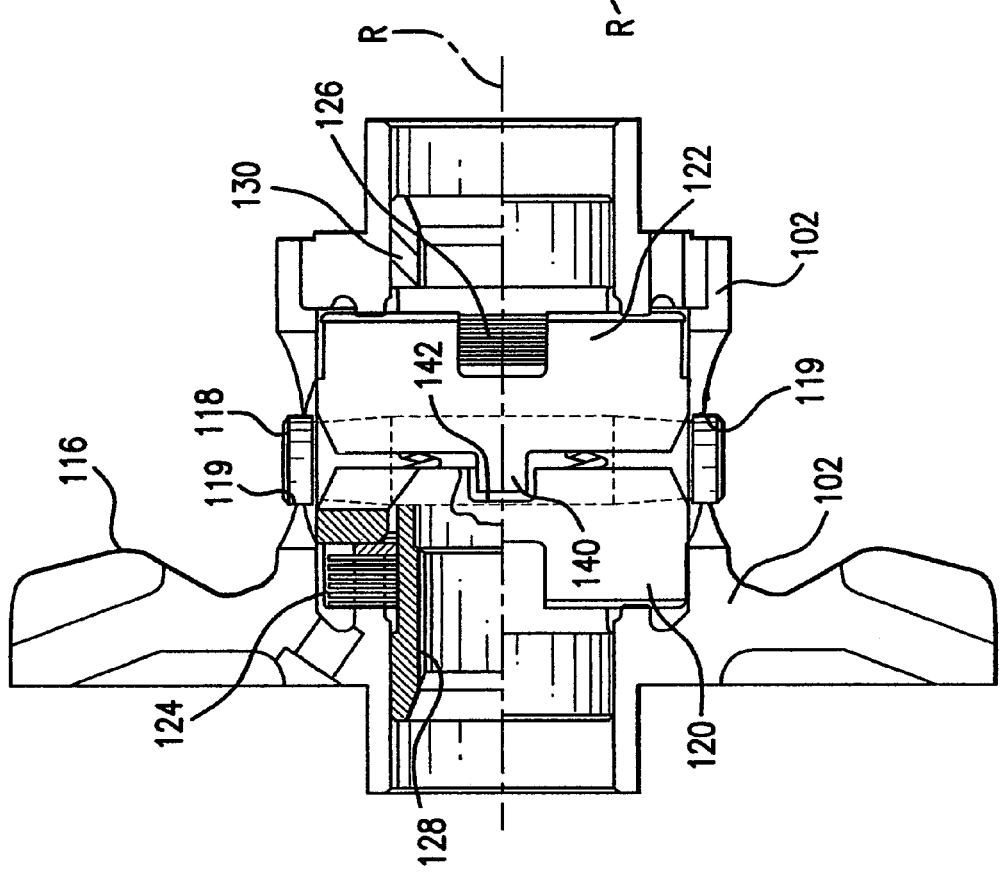
FIG. 20 is a partly sectioned elevation view of the improved locking differential of the present invention.
Figure 22:
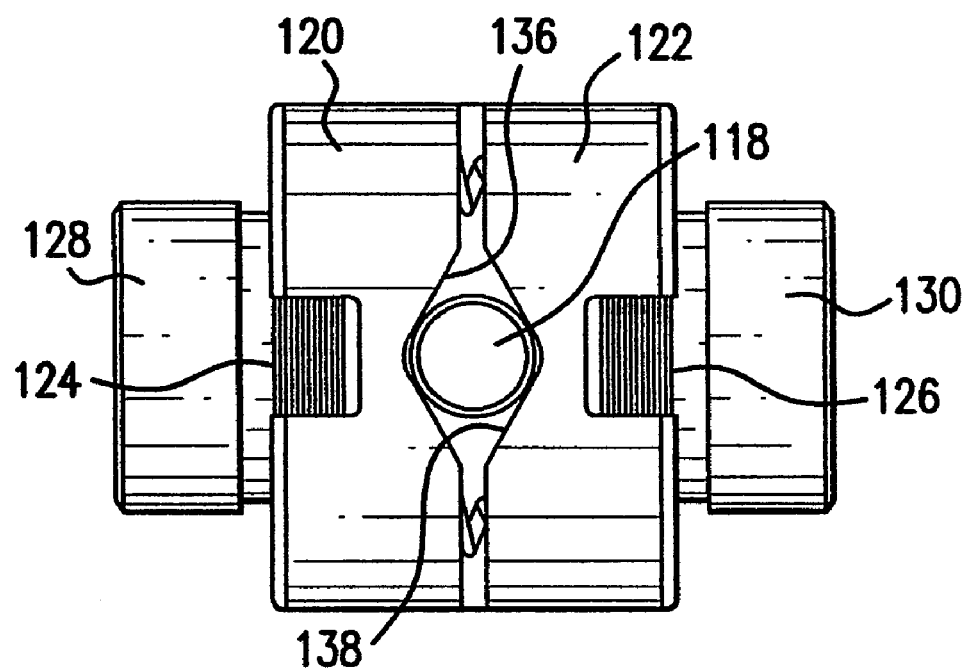
FIGS. 22 and 23 are detailed top and end views, respectively, of the clutch housing, side gear and friction clutch arrangement of the improved locking differential of FIG. 20.
Figure 23:
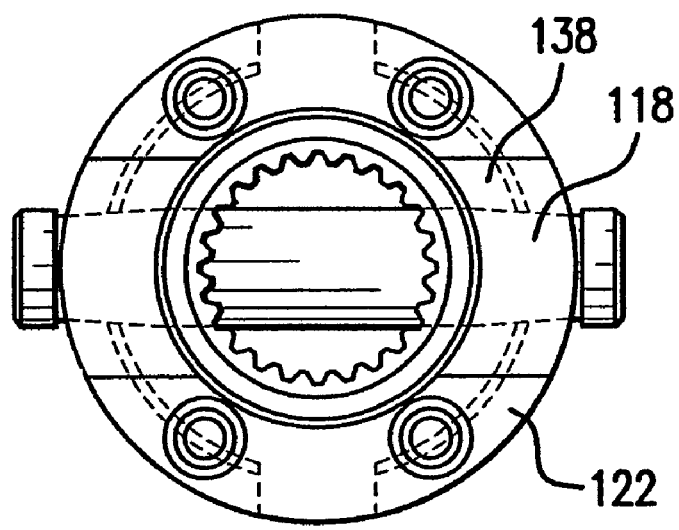
Figure 24:
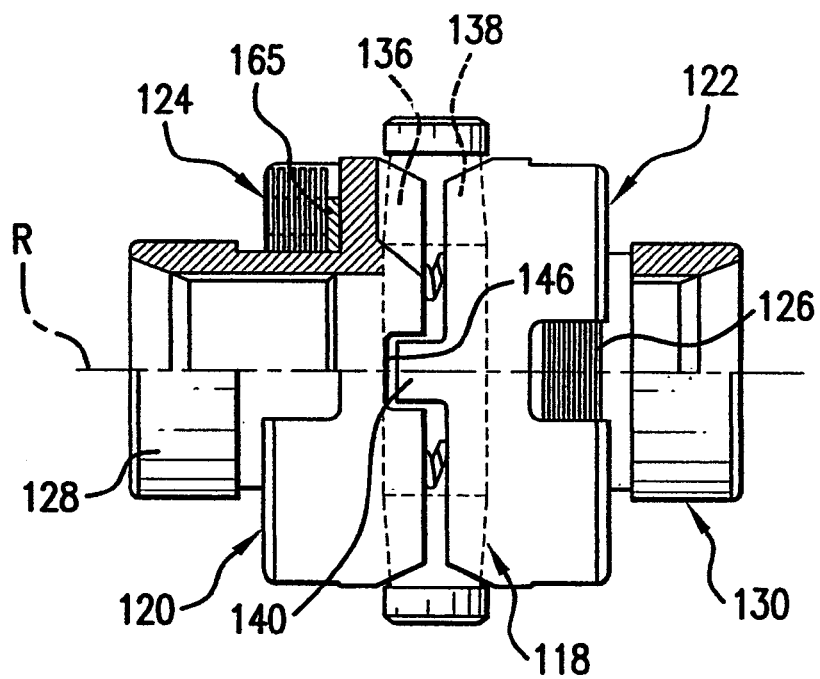
FIGS. 24-26 are partly sectioned side elevation, left hand and right hand views of the side gear, clutch housing and friction pack arrangement of FIG. 20.
Figure 25:
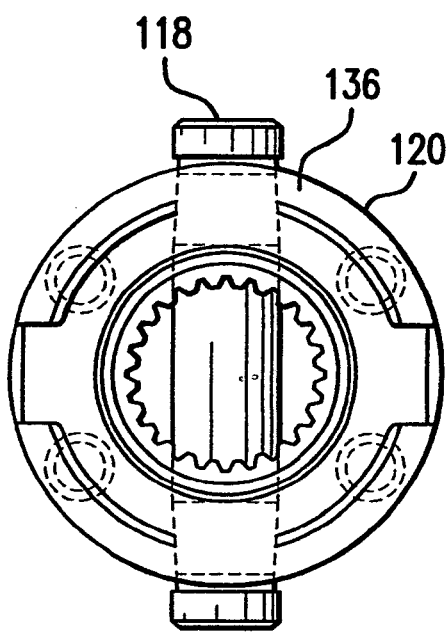
Figure 26:
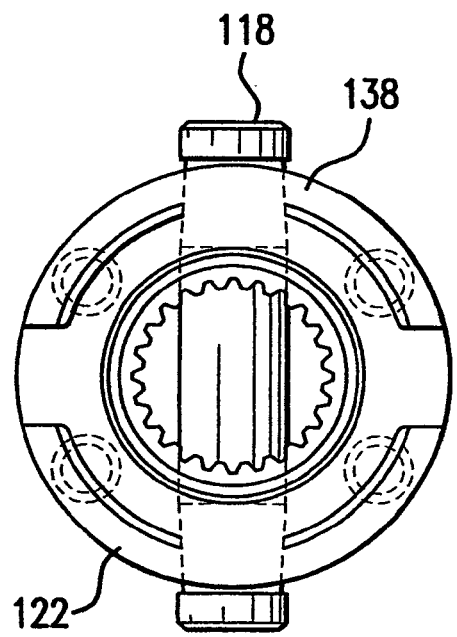
Figure 37:
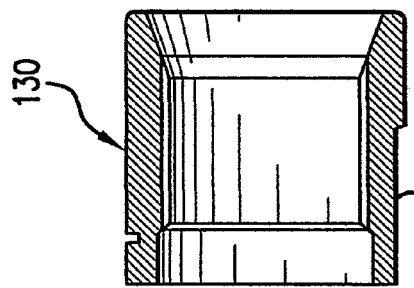
FIGS. 36 and 37 are end and longitudinal sectional views, respectively, of one of the improved side gears of FIG. 24.
Figure 39:
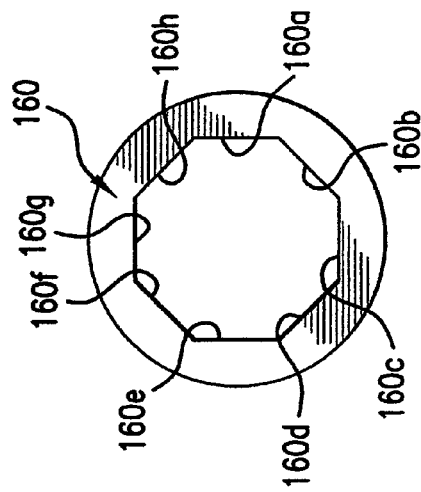
FIGS. 38 and 39 are end views of the improved reaction plate and friction plate of the differential of FIG. 24.

Referring first to the improvement best illustrated in FIGS. 22, 27 and 35, in this embodiment, the walls of the V-shaped slots 136 and 138 provided in the adjacent faces of the clutch housings 120 and 122 are planar and parallel with the differential axis of rotation R. Thus, there is no skewing of these surfaces, corresponding to the skewing of FIG. 16 of the prior art embodiment. Consequently, the machining of the V-shaped grooves is achieved in a simple, cost-effective manner. Instead of skewing the walls of the V-shaped slots, the cross pin 118 is provided with the novel design of FIG. 35. More particularly, the cross pin 118 includes a central body portion 118 *a* having the configuration of a right cylinder, and a pair of tapered end portions 118*b* and 118*c*. The end extremities 118*d* and 118*e* of the cross pin are supported in corresponding bores 119 contained in the housing 102, as shown in FIG. 20. The angle of taper α of the tapered end portions of the cross pin correspond to the angle of skew α of the V-slot side walls of FIG. 16. Thus, in the illustrated embodiment, the angle of taper α of the cross pin end portion is 3.853°. The length l of the main body portion 118a of the cross pin is 1.297 inches, and the length of each tapered portion m is 0.621 inches. The overall length of the cross pin is 2.539 inches. The cross pin may be produced by a simple centerless grinding technique. Thus, in new design, the V-shaped slot or ramps on the clutch housing are made in a two dimensional plane that can be manufactured and inspected by simply milling a slot straight across the clutch housing face. The new cross pin has been designed with angular surfaces that contact the "V" ramps of the clutch housing. It is easy to inspect the cross pin with this new configuration. When the cross pin is radially rotated by the same amount as the cross pin in the original design, it takes up the same end-play as the original design, distributes the load and gives a full clutch pack lock-up. This feature of the new differential gives the same positive performance as the original design differential with far easier manufacturing methods and less chance of manufacturing error.

According to a second improvement best illustrated in FIGS. 28-34, the locking lugs 140 and 142 have side walls 140a, 140b and 142a, 142b that are parallel with each other and with the axis of rotation R of the differential. Similarly, the oversized locking slots 146 and 148 have corresponding planar side walls 146a, 146b and 148a, 148b that are parallel with each other and with the differential axis of rotation R. The purpose of the key and notch is to restrict the angular movement between the two clutch housings so that the outside wheel, in a turn, cannot allow the associated clutch housing to run up the back side of the "V" and re-engage that clutch pack. By putting the key and slot on an angle (FIGS. 4 and 7), a surface contact is produced between the two to spread out the load. With straight sided key and slot, a line contact is produced, but the loading is so low that the manufacturing cost savings is more beneficial with the straight sided key and slot. The overall angular movement is the same for both designs.

Figure 21:
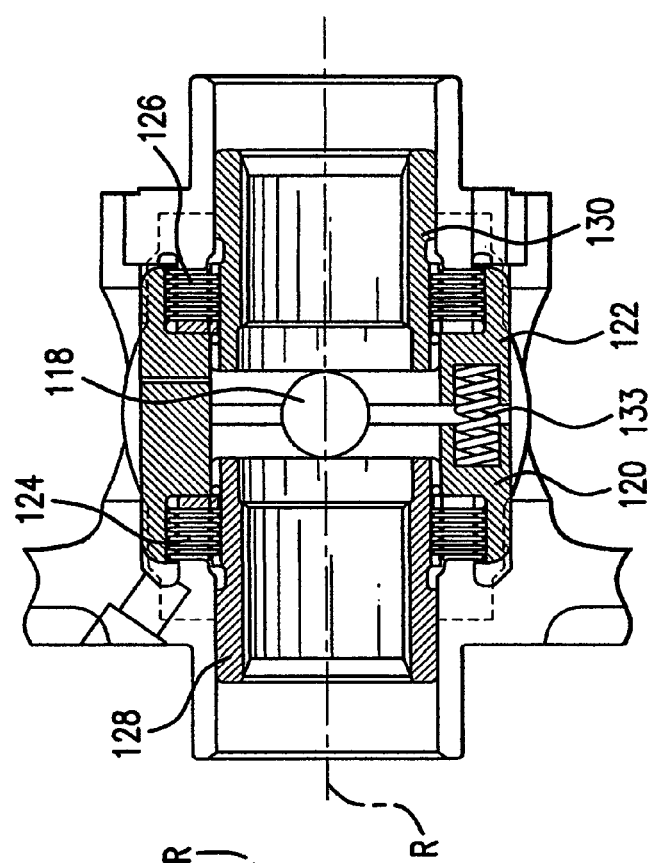
FIG. 21 is a detailed sectional view taken at right angles to the view of FIG. 20.
Figure 36:
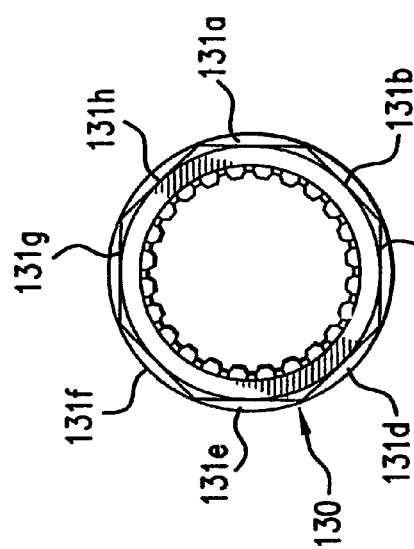
Figure 38:
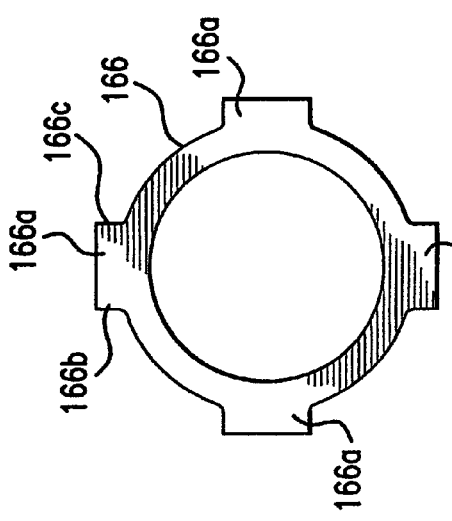

Referring now more particularly to FIGS. 36-40, the friction pack components have been redesigned to eliminate the spline connections of the prior art and to produce a more efficient, positive and durable overrunning-shaft clutching operation. To this end the side gears are provided with a polygonal outer circumferential surface, and the friction plates have corresponding polygonal inner circumferential surfaces. In FIG. 36 it will be seen that the side gear 130 has arranged about its circumference eight flat tangential surfaces 131a-131h. The first friction plates 160 have on their inner circumferential surfaces corresponding tangential flat surfaces 160a-106h. Thus, the corresponding flat tangential surfaces on the outer circumferential surface of the side gears and on the inner circumferential surfaces of the friction plates 160, respectively, connect the components in a non-rotational axially-displaceable non-binding manner. In like manner, the reaction plates 166 that are alternately stacked with the friction plates 160 have a small number of radially outwardly extending tab portions 166a each having straight parallel side walls 166b and 166c. These tab portions extend within corresponding longitudinal guide slots 121 and 123 contained in the counterbored end portions of the clutch housings 120 and 122, as best shown in FIGS. 27, 28 31 and 32. The clutch housings 120 and 122 are biased apart by compression springs 133, as shown in FIG. 21. The side walls 121a, 121b and 142a, 142b of the guide slots are parallel with each other and with the axis of rotation R of the differential. Thus, the reaction plates are guided for non-rotational axial sliding displacement in a simple bind-free inexpensively manufactured manner.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A locking differential for connecting the drive shaft of an automotive vehicle with a pair of collinearly-arranged axially-spaced driven shafts, comprising:
   (a) an outer casing containing an outer chamber, said casing having a pair of end wall portions containing a pair of opposed first openings defining an axis of rotation collinear with said driven shafts, and a side wall portion containing a second opening for receiving one end of the drive shaft;
   (b) an inner housing arranged in said outer chamber and having a pair of end portions mounted for rotation within said casing first openings, respectively, said inner housing containing an inner chamber, said housing end portions containing a pair of third openings communicating with said inner chamber and operable to receive the adjacent ends of said driven shafts, respectively;
   (c) pinion and ring gear means connecting said housing for rotation by the drive shaft one end relative to said casing;
   (d) a cross pin extending diametrically across said housing inner chamber, said cross pin including:
      (1) a right cylindrical central body portion (118a);
      (2) a pair of end extremity portions (118d, 118e) mounted in diametrically arranged bores contained in said inner housing; and
      (3) a pair of tapered end portions (118b, 118c) connected between said central body portion and said end extremity portions, respectively, the external surfaces of each of said tapered end portions being convergent in the direction of the associate end extremity;
   (e) a pair of tubular coaxially-arranged axially-spaced side gears rotatably mounted in said housing third openings on opposite sides of said cross-pin, respectively, said side gears being internally splined for non-rotatable connection with the adjacent ends of said output shafts, respectively;
   (f) a pair of coaxially-arranged axially-spaced annular clutch housings arranged concentrically about said side gears on opposite sides of said cross-pin, respectively, the remote ends of said clutch housings containing counterbores, respectively, the adjacent faces of said clutch housings containing diametrically extending cam grooves receiving said cross-pin, said cam grooves each having a generally V-shaped cross-sectional configuration defined by a pair of first planar walls arranged for cooperation with said cross-pin tapered end portions;
   (g) a pair of annular friction pack means arranged within said clutch housing counterbores concentrically about said side gears, respectively, each of said friction pack means including a plurality of successive alternate first and second annular friction plates, said first friction plates being connected by means including second planar surfaces for non-rotational axial sliding displacement relative to the associated side gear, said second friction plates being reaction plates connected by means including third planar surfaces for non-rotational sliding displacement relative to the associated clutch housing, each of said friction pack means being operable between a non-compressed condition in which successive friction plates are freely rotatable relative to each other, and an axially compressed condition in which said friction pack means is axially compressed between the bottom wall of said counterbore and the associated housing chamber end wall, thereby causing the friction plates to be in fae-to-face non-rotatable contact, and said clutch housing to be non-rotatably connected with the associated side gear;

(h) spring means normally biasing said clutch housings axially apart relative to said cross-pin; and (i) locking means connecting said clutch housings for limited angular displacement relative to each other, said locking means including at least one locking lug arranged on the face of one clutch housing and extending within a corresponding oversized radial locking slot contained in the adjacent face of the other clutch housing, said locking lug and said locking slot having associated fourth planar surfaces;

(j) said clutch housings and said cross pin being normally operable to compress said friction packs to drive the driven shafts at the same rotational velocity; said clutch housings and said cross pin being operable when one of the output shafts overruns the other by a given amount to angularly displace the associated oVerrunning side gear and clutch housing relative to said cross-pin, thereby to cause the associated overrunning friction pack means to be in its non-compressed condition, whereby the overrunning shaft is placed in a freewheeling disconnected condition relative to the drive shaft;

(k) said first, second, third and fourth planar surfaces extending parallel with said axis of rotation, thereby to simplify and reduce the manufacturing costs of the differential.

2. A locking differential as defined in claim 1, wherein the angle of taper of said cross pin end portions is from between about 2.5° and 4.5°.

3. A locking differential as defined in claim 2, wherein the length of each tapered end portion is about 25% of the length of said cross pin.

4. A locking differential as defined in claim 1, wherein the adjacent end portions of said side gears have in transverse cross-sections an outer circumferential surface that is generally polygonal, said second planar surfaces comprise a plurality of cooperating tangential surfaces circumferentially arranged on the outer and inner circumferential surfaces of each side gear and the associated first friction plates, respectively.

5. A locking differential as defined in claim 4, wherein said second friction plates include a plurality of circumferentially-spaced radially-outwardly-extending tab portions that extend within corresponding axially-extending grooves contained in the counterbore wail surfaces of said clutch members respectively, said tab portions and said grooves having corresponding parallel side walls, respectively, that define said third planar surfaces.

6. A locking differential as defined in claim 1, wherein said locking lug has a generally rectangular cross-sectional configuration and includes a pair of parallel side walls, said locking slot having a corresponding pair of parallel side walls, said lug and said groove side walls defining said fourth planar surfaces.

7. A locking differential for connecting the drive shaft of an automotive vehicle with a pair of collinearly-arranged axially-spaced driven shafts, comprising:

(a) an outer casing containing an outer chamber, said casing having a pair of end wall portions containing a pair of opposed first openings defining an axis of rotation collinear with said driven shafts, and a side wall portion containing a second opening for receiving one end of the drive shaft;

(b) an inner housing arranged in said outer chamber and having a pair of end portions mounted for rotation within said casing first openings, respectively, said inner housing containing an inner chamber, said housing end portions containing a pair of third openings communicating with said inner chamber and operable to receive the adjacent ends of said driven shafts, respectively;

(c) pinion and ring gear means connecting said housing for rotation by the drive shaft one end relative to said casing;

(d) a cross pin extending diametrically across said housing inner chamber, said cross pin having a pair of end portions that are non-rotatably connected with said housing;

(e) a pair of tubular coaxially-arranged axially-spaced side gears rotatably mounted in said housing third openings on opposite sides of said cross-pin, respectively, said side gears being internally splined for non-rotatable connection with the adjacent ends of said output shafts, respectively;

(f) a pair of coaxially-arranged axially-spaced annular clutch housings arranged concentrically about said side gears on opposite sides of said cross-pin, respectively, the remote ends of said clutch housings containing counterbores, respectively, the adjacent faces of said clutch housings containing diametrically extending generally V-shaped cam grooves receiving said cross-pin;

(g) a pair of annular friction pack means arranged within said clutch housing counterbores concentrically about said side gears, respectively, each, of said friction pack means including a plurality of successive alternate first and second annular friction plates, said first friction plates being connected for non-rotational axial sliding displacement relative to the associated side gear, said second friction plates being connected for non-rotational sliding displacement relative to the associated clutch housing, each of said friction pack means being operable between a non-compressed condition in which successive friction plates are freely rotatable relative to each other, and an axially compressed condition in which said friction pack means is axially compressed between the bottom wall of said counterbore and the associated housing chamber end wall, thereby to causing the friction plates to be in face-to-face non-rotatable contact, and said clutch housing to be non-rotatably connected with the associated side gear;

(h) spring means normally biasing said clutch members axially apart relative to said cross-pin; and (i) locking means connecting said clutch housings for limited angular displacement relative to each other, said locking means including at least one integral locking lug (140, 142) arranged on the face of one clutch housing adjacent the outer circumference thereof and extending within a corresponding oversized radial locking slot (146, 148) contained in the adjacent face of the other clutch housing, said locking lug having a pair of flat parallel side walls, and said slot having a corresponding pair of flat parallel side walls, said parallel side walls of said locking lug and said locking slot being parallel with the axis of rotation of said differential housing;

(j) said clutch housings and said cross pin being normally operable to compress said friction packs to drive the driven shafts at the same rotational velocity; said clutch housings and said cross pin being operable when one of the output shafts overruns the other by a given amount to angularly displace the associated overrunning side gear and clutch housing relative to said cross-pin, thereby to cause the associated overrunning friction pack means to be in its non-compressed condition, whereby the overrunning shaft is placed in a free-wheeling disconnected condition relative to the drive shaft.

* * * * *